Jan. 28, 1930.  J. D. SCOTT  1,745,031
INDICATOR SWITCH FOR TANKS
Filed June 3, 1926
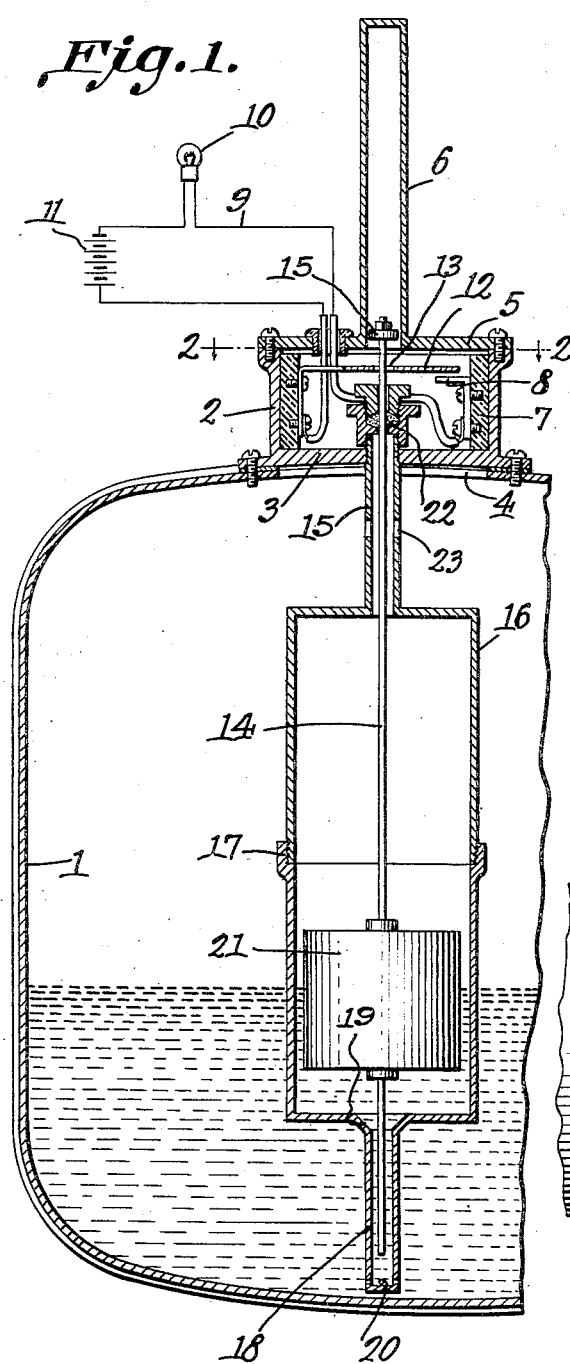
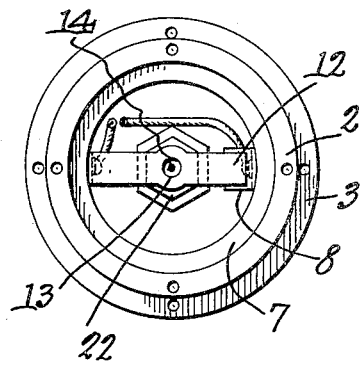
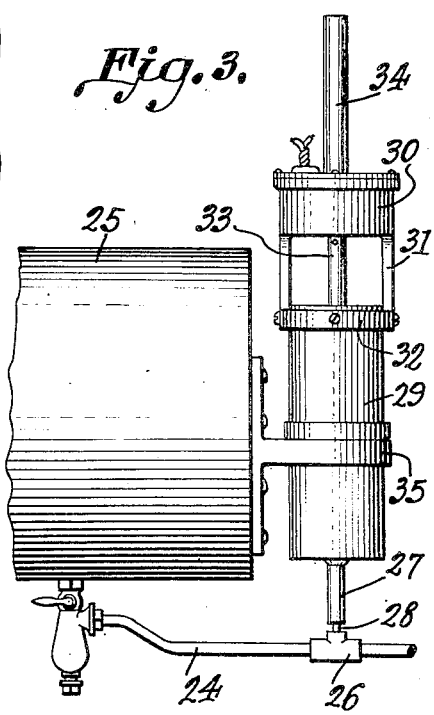
James D. Scott  Inventor
By C. A. Snow & Co.
Attorneys Patented Jan. 28, 1930

1,745,031

UNITED STATES PATENT OFFICE

JAMES D. SCOTT, OF CURLEW, KENTUCKY

INDICATOR SWITCH FOR TANKS

Application filed June 3, 1926. Serial No. 113,467.

This invention relates to an indicator designed primarily for use in connection with gas tanks, engine crank cases, fuel feed lines and other places on motor vehicles where the use of an indicator is desirable for indicating when gas, oil or other fluid has reached a low level.

One of the objects of the invention is to provide a simple and efficient indicator which can be applied readily to a tank, crank case or supply line, this indicator including an operating float so arranged as to be practically unaffected by certain changes in the level of the fluid due to intermittent swaying or jolting of the structure.

A further object is to provide a simple form of circuit closer controlled by the float and whereby a signal in the form of a lamp or the like can be operated when the level of the float operating fluid falls to a predetermined point.

With the foregoing and other objects in view which will appear as the description proceeds, the invention resides in the combination and arrangements of parts and in the details of construction herein described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a section through the indicator constituting the present invention, the electric circuit controlled by the float operating mechanism being shown in diagram.

Figure 2 is an enlarged section on line 2—2, Figure 1.

Figure 3 is an elevation of the modified form of the invention.

Referring to the figures by characters of reference 1 designates a container which can be in the form of a gas tank, crank case or the like in which gas, oil or other fluid is stored. The present invention includes a switch box 2 having a closed bottom 3 adapted to be secured in any suitable manner to the top of the container 1. In the structure illustrated in Figure 1 this box bridges an opening 4 formed in the top of the container. A cover plate 5 is secured upon the switch box and has a tubular extension 6 projecting upwardly therefrom. Within the switch box is an insulating ring 7 carrying a contact 8 constituting one terminal of an electric circuit 9 including a signal device 10 and a battery 11 or other source of electricity. In the present instance the signal device is in the form of a lamp. A spring finger 12 is also connected to the insulating ring 7 and constitutes the other terminal of the electric circuit. This finger extends over and is normally spaced from the contact 8. An opening 13 is provided in the finger and mounted to work freely within this opening is a rod 14 to the upper end of which is secured a disk 15 adapted to guide the rod within the extension 6.

Depending from the switch box 2 is a tube 15 which projects from the top of a float casing 16 and serves to suspend the said casing within the container 1. This float casing can be formed of two opposed cylindrical members glued together as shown at 17 the lower member being provided with a depending inlet tube 18. This tube has its upper end flared as indicated at 19 while its lower end portion is provided with one or more small inlet openings 20. The rod 14 is extended downwardly through the float casing 16 and into the depending tube 18 and has a float 21 secured to it. The upper portion of this rod slides freely within a packing gland 22 arranged within the switch box 2 at the upper end of the tubular hanger 15. One or more air vents 23 can be suitably located in the hanger 15 or within the casing 16 as preferred.

As already pointed out the switch box is adapted to be secured upon a container 1 and obviously the float casing will thus be supported within the container with the lower end of the tube 18 located close to the bottom of the container. Consequently the liquid in the container will be free to rise within the float chamber through the small opening 20. Thus float 21 will work upwardly and downwardly with the level of the liquid in the casing 16. Should the level of the liquid in the container 1 vary intermittently because of the jolting or tilting of the structure, the level of the liquid in the casing 6 would not as quickly change because of the smallness of the aperture 20 through which the liquid must flow in order to change the level in the casing 16. Consequently, in spite of jolting and swaying and the consequent variation in the level of the liquid in container 1, the liquid in casing 16 will remain practically unchanged except where it is raised or lowered as the result of filling the casing 1 or withdrawing liquid from said container 1.

When the level of liquid within the container falls to a predetermined point the disk 15 on the rod 14 comes against the spring finger 12 and presses it downwardly against contact 8. Thus the circuit to the signal device 10 will be closed and the operator will have notice that the container 1 needs to be filled or replenished.

Instead of mounting the signal device as described and as shown in Figure 1, it can be connected to the supply pipe 24 leading to a container 25. When the indicator is thus located a T-fitting 26 is arranged in the pipe 24 and a depending tube 27 corresponding with the tube 18 is connected to this T-fitting through a small coupling pipe or tube 28. The float casing 29 corresponds with the casing 16 and the switch box 30 also corresponds with the switch box 2. However instead of mounting the switch box 30 on a container as shown in Figure 1, it is supported by standards 31 extending from a collar 32 secured about the float casing 29. The tubular hanger 33 extends from the top of the float casing 29 to the bottom of the switch box and assists in holding the switch box properly spaced from the float casing. The tubular extension 34 on the top of the switch box corresponds with the extension 6.

In this modified structure the operation is the same as has already been described. The bottom of the float casing 27 is positioned slightly above the level of the bottom of the container 25. Thus when the level of the fluid in the container drops to a predetermined point the level of the fluid in the casing 29 will also drop with the result that float 21 will actuate the switch and cause the circuit to the alarm to be closed. In view of the small size of the coupling tube 28, the level of the fluid in the casing 29 will not rise and fall with the rapid rise and fall of liquid in the container 25 due to jolting and swaying. Instead it will only rise and fall gradually when the container 25 is filled or while liquid is being withdrawn therefrom.

Any suitable means may be provided for supporting the float casing in fixed position relative to the container 25. For example a bracket 35 can be extended from the container 25 and the float casing can be mounted therein as shown.

What is claimed is:

The combination with a liquid container having an opening therein, of a switch box having a bottom secured to the container and constituting a tight closure for the opening, a float casing, a tube extending upwardly from the float casing and secured in the bottom of the switch box, said tube constituting means for fixedly connecting the float casing to the switch box and for suspending said casing in the container, an inlet tube extending downwardly from the float casing to a point close to the bottom of the container, there being a vent in the supporting tube opening into the upper portion of the container, a float in the casing, a rod extending in opposite directions from the float and movable freely within the supporting and inlet tubes, one end portion of the rod being extended through the switch box, a tubular extension on the switch box, means on one end of the rod and slidable within said extension for guiding the rod, a gas tight seal around the rod and mounted on the bottom of the switch box, a stationary contact in said switch box, and a movable contact cooperating therewith for actuation by the rod during the downward movement of the float and rod, said contact being included in a signal circuit.

In testimony that I claim the foregoing as my own, I have hereto affixed my signature.

JAMES D. SCOTT.